United States Patent [19]

Fuma et al.

[11] Patent Number: 5,402,406
[45] Date of Patent: Mar. 28, 1995

[54] READ ONLY DIGITAL AUDIO INFORMATION RECORDING MEDIUM AND DIGITAL DUBBING SYSTEM THEREFOR

[75] Inventors: Masato Fuma, Aichi; Nagatoshi Sugihara, Gifu, both of Japan

[73] Assignee: Sanyo Electric Co., Ltd., Osaka, Japan

[21] Appl. No.: 271,560

[22] Filed: Jul. 7, 1994

Related U.S. Application Data

[63] Continuation of Ser. No. 954,118, Sep. 30, 1992, abandoned.

[30] Foreign Application Priority Data

Oct. 3, 1991 [JP] Japan .................. 3-256561

[51] Int. Cl.[6] .............................. G11B 7/28
[52] U.S. Cl. .............................. 369/84; 360/15
[58] Field of Search .............. 369/13, 47–48, 369/54, 58, 83–84, 124; 360/14.1, 15; 395/600 MS

[56] References Cited

U.S. PATENT DOCUMENTS

| | | | |
|---|---|---|---|
| 4,879,704 | 11/1989 | Takagi et al. | 369/14 |
| 4,992,886 | 2/1991 | Klappert | 358/342 |
| 5,097,349 | 3/1992 | Nomura et al. | 369/48 X |
| 5,146,369 | 9/1992 | Yamaguchi | 360/15 |
| 5,177,619 | 1/1993 | Sato | 360/15 X |

FOREIGN PATENT DOCUMENTS

62-279585 12/1987 Japan .

OTHER PUBLICATIONS

"Compact disc digital audio system", *Commission Electrotechnique Internationale/International Electrotechnical Commission*, Publication 908:1987 (IEC 1987), pp. 1–61; and amendment 1 (1992), pp. 1–20.

Ken C. Pohlmann, "The Compact Disc Formats: Technology and Applications", *Journal of the Audio Engineering Society*, vol. 36, No. 4, Apr. 1988, New York, pp. 250–282.

Murata et al., "Multimedia Type Digital Audio Disc System", *IEEE Transactions on Consumer Electronics*, vol. 35, No. 3, pp. 544–551, Aug. 1989.

Torazawa et al., "Erasable Digital Audio Disk System", *Applied Optics*, vol. 25, No. 22, pp. 3990–3995, Nov. 15, 1986.

*Primary Examiner*—W. R. Young
*Attorney, Agent, or Firm*—Peter L. Michaelson

[57] ABSTRACT

A read only disc according to the present invention has a spiral recording track formed on the surface thereof. The recording track includes a plurality of record unit blocks formed continuously by an optical recording method, wherein each record unit block includes a dubbing permitted area and a dubbing inhibited area. Digital audio information having compressed data is recorded in the dubbing permitted area. On the other hand, display data associated with the digital audio information is recorded in the dubbing inhibited area. Thus, digital dubbing of digital audio information can be carried out and dubbing of display data is prevented to ensure dominance of the read only disc as a master software.

8 Claims, 7 Drawing Sheets

FIG. 2
AUDIO DATA A
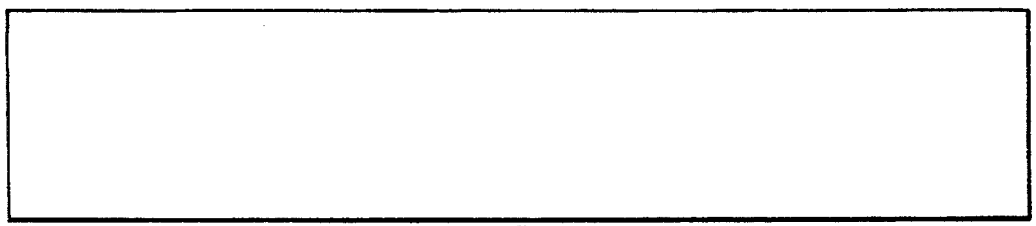
⇩
COMPRESSED DATA OUTPUT B
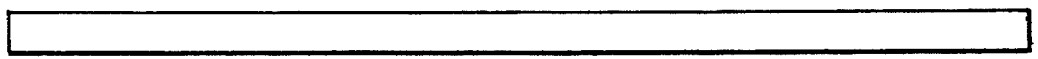
⇩
TIME BASE COMPRESSED
AUDIO DATA C
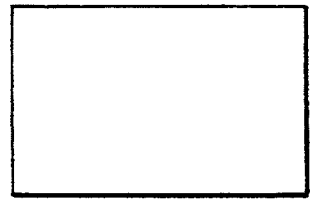
⇩
INTERMITTENT DATA D
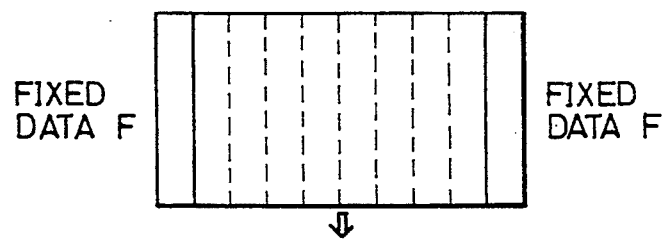
FIXED DATA F        FIXED DATA F
⇩
E F M DATA E

READ ONLY DIGITAL AUDIO INFORMATION RECORDING MEDIUM AND DIGITAL DUBBING SYSTEM THEREFOR

CROSS REFERENCE TO RELATED APPLICATION

This application is a continuation of patent application serial number entitled "Read Only Digital Audio Information Recording Medium and Digital Dubbing System Therefor" filed on Sept. 30, 1992, as U.S. Ser. No. 07/954,118, now abandoned.

BACKGROUND OF THE INVENTION

1. Field of the Invention

The present invention relates to a read only digital audio information recording medium, and more particularly, to a read only digital audio information recording medium in which dominance as a master software is ensured in dubbing and a digital dubbing system therefor.

Description of the Background Art

In recent years, the digital dubbing technique of audio information has been developed. Since no dropout of the audio information is caused by such digital dubbing technique as compared with the conventional analog dubbing technique, complete copy of the audio information can be made. In other words, a copy software having quality equal to that of a master software can be duplicated by digital dubbing.

However, such accurate duplication of the master software has caused a problem concerning copyright since dominance as a master software can not be ensured by such digital dubbing. Such problem concerning copyright has been an obstacle to marketing of recording apparatus having such digital dubbing function.

Therefore, the law allowing copy of only the master software and prohibiting copy of the copy software again has been legislated or being legislated throughout the world.

Even if such dubbing from the copy software is prohibited by the law, however, there is no restriction on the direct copy of the master software and therefore, the dominance as a master software substantially cannot be ensured. As a result, there is a possibility that the problem of copyright might become a serious obstacle to marketing of such recording apparatus.

SUMMARY OF THE INVENTION

In view of the foregoing, a main object of the present invention is to provide a read only digital audio information recording medium that allows digital dubbing of only digital audio information while ensuring dominance as a master software.

Another object of the present invention is to provide a digital dubbing system which allows digital dubbing of only digital audio information from a read only digital audio information recording medium, while ensuring dominance as a master software.

A further object of the present invention is to provide a high speed dubbing system which allows high speed digital dubbing of only digital audio information from a read only digital audio information recording medium, while ensuring dominance as a master software.

A read only digital audio information recording medium according to the present invention includes a spiral recording track formed on the surface which is constituted by a plurality of record unit blocks formed continuously, wherein each record unit block includes a dubbing permitted area where digital audio information is recorded and a dubbing inhibited area where associating information in synchronization with the digital audio information is recorded.

According to another aspect of the present invention, a digital dubbing system comprises a reproducing apparatus and a recording apparatus. The reproducing apparatus intermittently reproduces a read only digital audio information recording medium having a spiral recording track which includes a plurality of record unit blocks formed continuously, each of said record unit blocks comprising a dubbing permitted area where compressed digital audio information is recorded and a dubbing inhibited area where associating information is recorded, to intermittently supply the reproduced compressed digital audio information. The recording apparatus intermittently records record unit blocks each including said reproduced compressed digital audio information with fixed information added, onto a digital audio information recording and reproducing medium.

According to a further aspect of the present invention, a high speed digital dubbing system comprises a reproducing apparatus and a recording apparatus. The reproducing apparatus continuously reproduces a read only digital audio information recording medium having a spiral recording track which includes a plurality of record unit blocks formed continuously, each of the record unit blocks comprising a dubbing permitted area where compressed digital audio information is recorded and a dubbing inhibited area where associating information is recorded, to continuously supply the reproduced compressed digital audio information. The recording apparatus continuously records record unit blocks each including the reproduced compressed digital audio information with fixed information added, onto a digital audio information recording and reproducing medium.

According to the present invention, digital dubbing of digital audio information is allowed because digital audio information is recorded in the dubbing permitted area of the recording track, and dominance as a master software can be ensured because the associating information is recorded in the dubbing inhibited area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 schematically shows the conditions of the audio data in respective portions of the recorder shown in FIG. 1.

DESCRIPTION OF THE PREFERRED EMBODIMENTS

A small size disc is proposed as a digital audio information recording medium that allows recording/reproduction of digital audio information by employing magneto-optical recording/reproduction principle. These proposed small size discs are used in a disc player of portable types or for vehicles, and audio information of 74 minutes in maximum can be recorded on one side of a disc of approximately 7 cm in diameter.

In such a small size disc, intermittent recording/reproduction of a digital audio signal is proposed for realizing recording of a long period. Briefly, intermittent recording/reproduction of a digital audio signal is to thin out (data compress) a digital audio signal to approximately 1/5 for recording the same on a disc by magneto-optical recording principle, and expanding the data reproduced from the disc by magneto-optical reproduction principle by 5 times for forming the original continuous digital audio signal. Such magneto-optical recording/reproduction principle is disclosed in IEEE Transactions on Consumer Electronics, Vol. 35, No. 3 "Multimedia Type Digital Audio Disc System" issued on August, 1989, by S. Murata et al., and in Applied Optics Vol. 25, No. 22 "Erasable Digital Audio Disc System" issued November, 1986, by Torazawa et al. Briefly stated, this principle is to heat a magnetic layer of a disc with a laser beam to magnetize the magnetic layer by a recording signal under that condition to store information in a disc.

Such a small size disc has a continuous spiral guide groove previously formed on the surface of the disc. An ADIP code (Address Time in Pregroove) indicating the absolute position of a recording track is multiplexed in advance in this guide groove. The ADIP code includes the absolute time and frame numbers. Multiplexing this ADIP code on a guide groove is carried out as follows. The ADIP code is FM-modulated, whereby a guide groove is formed by spatial-modulation in the width direction according to the modulation signal. By directing a laser beam onto thus formed guide groove, the modulation signal components are detected as a tracking error signal, whereby the detected signal is used as an index indicating the absolute address of the recording track at the time of recording and reproducing audio data.

Figure 1:
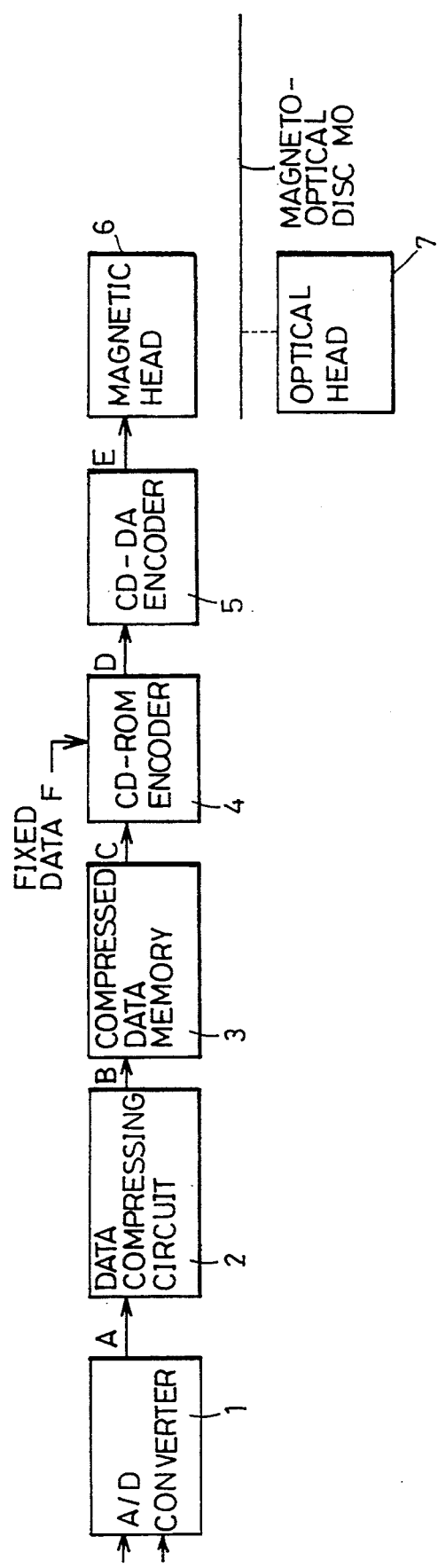
FIG. 1 is a block diagram schematically showing the structure of a recorder for small size disc using the magneto-optical recording principle.

FIG. 1 schematically shows a structure of a recorder for a small size disc using such magneto-optical recording principle, and FIG. 2 schematically shows the conditions of audio data in respective portions of the recorder.

Referring to FIG. 1, a two-channel analog audio signal provided from an external audio signal source not shown is converted into digital audio data A (FIG. 2) by an A/D converter 1. The digital audio data A is data compressed to approximately 1/5 (B of FIG. 2) by a data compressing circuit 2 to be sequentially stored in a compressed data memory 3. When audio data corresponding to approximately two seconds (32 subcode frames, i.e. 32 sectors) which is one unit block of intermittent recording is stored in the compressed data memory 3, the recorder enters a write ready state, and an optical head 7 for reproduction searches the end of a recording track formed by an immediate previous recording operation according to the above-described ADIP code.

When the end of the immediately previously formed recording track is detected, the audio data of the above-described one unit block of record (32 sectors) is read out at high speed from the memory 3 to be provided to a CD-ROM encoder 4 as a time base compressed audio data C (FIG. 2). The CD-ROM encoder 4 applies synchronizing data to the audio data in every sector, and applies fixed data F for a predetermined time period before and after the audio data C to form intermittent data D (FIG. 2). This fixed data is a blank data of no signals and serves to prevent audio data diffused by an interleaving process described afterwards from protruding out the blank data. The broken lines in intermittent data D in FIG. 2 indicate that the audio data is formed of a plurality (32) of sectors.

The intermittent data D is next provided to a CD-DA encoder 5 to have a subcode identifying that sector applied and subjected to an interleaving process and an EFM modulation process to be provided to a magnetic head 6 as EFM data E (FIG. 2). This formed one unit of data E is implemented with 36 sectors including 32 sectors of audio data, 1 sector of a subcode, and 3 sectors of fixed data. This recording unit is referred to as one cluster hereinafter. The aforementioned encoders 4 and 5 have well known structures used as a recording device of a compact disc (CD), except for the application of fixed data, and their detailed description will be omitted.

The magnetic layer of the recording position of a magneto-optical disc MO is heated by a laser beam directed to the back side of the disc MO from the optical head 7, whereby the magnetic layer in the guide groove is magnetized (magnetic field modulated) in response to the EFM data E by the magnetic head 6 under this condition to form an intermittent recording track of one cluster by the above-described magneto-optical recording principle. By repeating the formation of an intermittent recording track of one cluster, a spiral recording track as one continuous track is formed in the guide groove.

A read only disc is proposed having a recording format in common with the above-described recording format of a small size disc, and having signals recorded by forming optical pits as in a conventional CD.

The recording of an audio signal to a read only disc is carried out by recording continuously an audio signal provided from a tape by a video cassette recorder, whereby a large number of read only discs can be duplicated based on thus manufactured original disc. The read only disc differs from the small size disc using the above described intermittent recording in that the data can be prevented from being broken due to overlapped recording since intermittent recording is not made so that the data can be recorded as continuous sectors as in case of the conventional CD, resulting in omission of the fixed data of three sectors. As a result, the information associating the audio signal can be recorded in the area for such omitted fixed data. In other words, subdata of any contents can be recorded into a storage area corresponding to the storage area of three sectors for the fixed data in each cluster. Such arbitrary data may include display data such as lyrics information recorded on the subcode area of a conventional CD (CD graphic)

and still picture data that changes according to the contents of the audio data.

Figure 3:
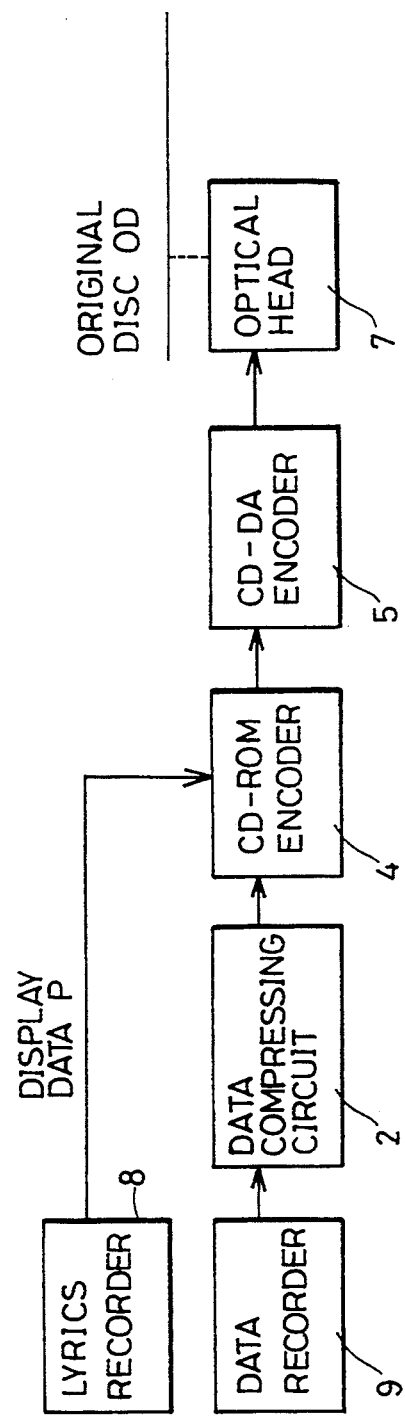
FIG. 3 is a block diagram schematically showing a structure of a recorder for an original disc for a disc dedicated to reproduction according to an embodiment of the present invention.

FIG. 3 schematically shows a structure of a recorder for manufacturing an original disc for read only discs. Referring to FIG. 3, digital audio data provided continuously from a data recorder 9 such as a video cassette recorder at a speed four times that of the normal recording/reproduction speed is data compressed into approximately 1/5 by a data compressing circuit 2 to be provided to the CD-ROM encoder 4. The lyrics recorder 8 has lyrics information corresponding to the above-described audio data recorded in advance as display data P in the format of character data, which is read out in synchronization with the provision of audio data from the data recorder 9 to be provided to the CD-ROM encoder 4, similar to the fixed data F of FIG. 1.

In CD-ROM encoder 4, one cluster having one sector of control data and three sectors of display data P added to the 32 sectors of audio data is subjected to a predetermined process such as the application of a synchronizing data to be provided to the CD-DA encoder 5. The CD-DA encoder 5 applies a subcode to the data continuously provided without gap. The CD-DA encoder 5 also applies an interleave process and an EFM modulation process to convert the data into continuous EFM data. The EFM data is applied to the optical head 7 to be sequentially recorded optically on the surface of an original disc OD, whereby a continuous recording track is formed thereon.

Thus, according to an embodiment of the present invention, display data such as lyrics data associated with audio data is recorded in the extra recording area of a read only disc.

Figure 4:
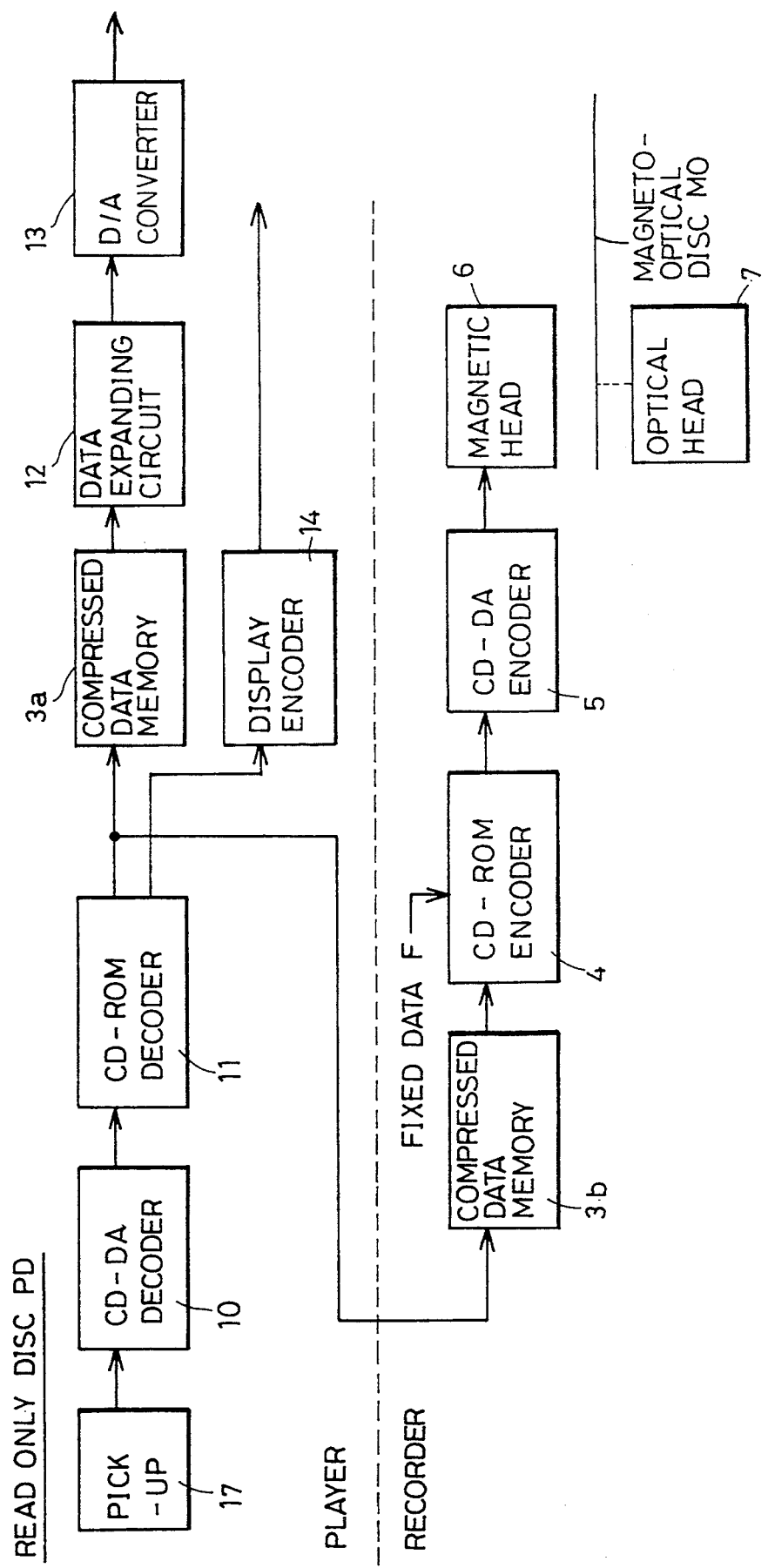
FIG. 4 is a block diagram showing a dubbing system according to an embodiment of the present invention.
Figure 5:
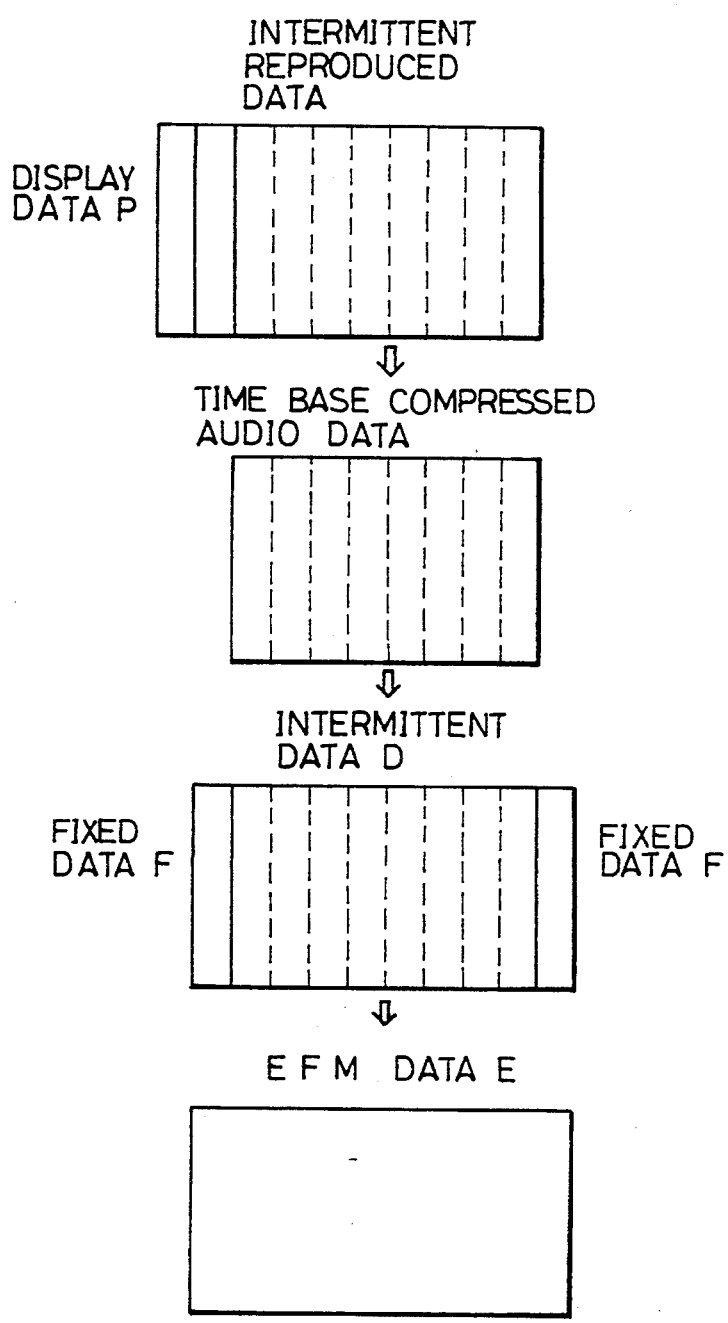
FIG. 5 is a diagram schematically showing the conditions of the audio data in respective portions of the system shown in FIG. 4.

FIG. 4 is a block diagram schematically showing a dubbing system according to an embodiment of the present invention for dubbing information from a read only disc PD obtained by copying an original disc OD manufactured as shown in FIG. 3. FIG. 5 schematically shows the conditions of audio data in respective portions of the system of FIG. 4.

The embodiment shown in FIGS. 4 and 5 show the case of carrying out dubbing at a normal reproduction speed of a digital audio data using the small size disc recorder shown in FIG. 1 from a read only disc having an area where display data P is recorded. Referring to FIG. 4, the upper portion and the lower portion divided by a central broken line indicates the main components of a player for a read only disc and the main components of a recorder for a small size disc, respectively.

Referring to FIG. 4, a pick-up 17 reproduces intermittently recorded data corresponding to the intermittent recording data of one cluster (36 sectors) from a read only disc PD to provide the same to the CD-DA decoder 10. The CD-DA decoder 10 applies a predetermined process such as EFM demodulation and de-interleave process to the supplied reproduced data to provide the same to the CD-ROM decoder 11.

The CD-ROM decoder 11 removes synchronizing components and the like from the received reproduced data, and separates the data into 1 sector of control data and 32 sectors of audio data, and to 3 sectors of display data P. The former is provided to the compressed data memory 3a of the player side and simultaneously to the compressed data memory 3b of the recorder side to be respectively recorded at high speed. The latter is also provided to a display encoder 14.

Data is read out continuously at a low speed from the memory 3a of the player side to be provided to a data expanding circuit 12. The data expanding circuit 12 restores the reproduced compressed data to its original format and provide the same to a D/A converter 13. The D/A converter 13 converts the digital audio signal into an analog audio signal of two channels which is provided to an external audio monitor means not shown.

The display data P of character codes separated by the CD-ROM decoder 11 is converted into a pattern signal by the display encoder 14 to be provided to an external video monitor means not shown. By reproducing a read only disc PD with a player, the user can enjoy karaoke viewing the lyrics on the video monitor while listening to the music from the audio monitor means.

As described above, the compressed audio data output (including control data) from the CD-ROM decoder 11 having display data P removed is stored in the memory 3b to be read out at high speed on cluster basis, similar to the normal recording of the small size disc shown in FIG. 1. The audio data read out from the memory 3b is applied to the CD-ROM encoder 4 where synchronizing data and the like is applied on sector basis to the audio data. The CD-ROM encoder 4 also applies fixed data F before and after the audio data for a predetermined period to form intermittent data D (FIG. 5).

The intermittent data D is applied to the CD-DA encoder 5 to have a subcode identifying the sector applied, and is subjected to an interleave process and an EFM modulation process. This EFM data E (FIG. 5) is applied to the magnetic head 6. Then, as in the case of FIG. 1, recording of EFM data onto the small size (magneto-optical) disc MO is carried out repetitively by the magnetic head 6 and the optical head 7, whereby a spiral recording track as one continuous track is formed.

Thus, the embodiment shown in FIG. 4 has the reproduction operation and the recording operation carried out at the normal speed respectively at the player side and the recorder side. Then, the compressed audio data having display data P removed, supplied from the CD-ROM decoder 11 of the player side at a high speed intermittently, is applied to the CD-ROM encoder 4 of the recorder side, whereby fixed data of 3 sectors are applied instead of the three sectors of display data P to be magneto-optical recorded on the small size disc MO. Therefore, according to the embodiment shown in FIG. 4, only the digital audio reproduced intermittently from the read only disc is dubbed to the small size disc directly as a digital signal. Therefore, the dubbing of display data P of the intermittent reproduced data is prevented unconditionally, to ensure dominance as a master software of the disc dedicated to reproduction.

Figure 6:
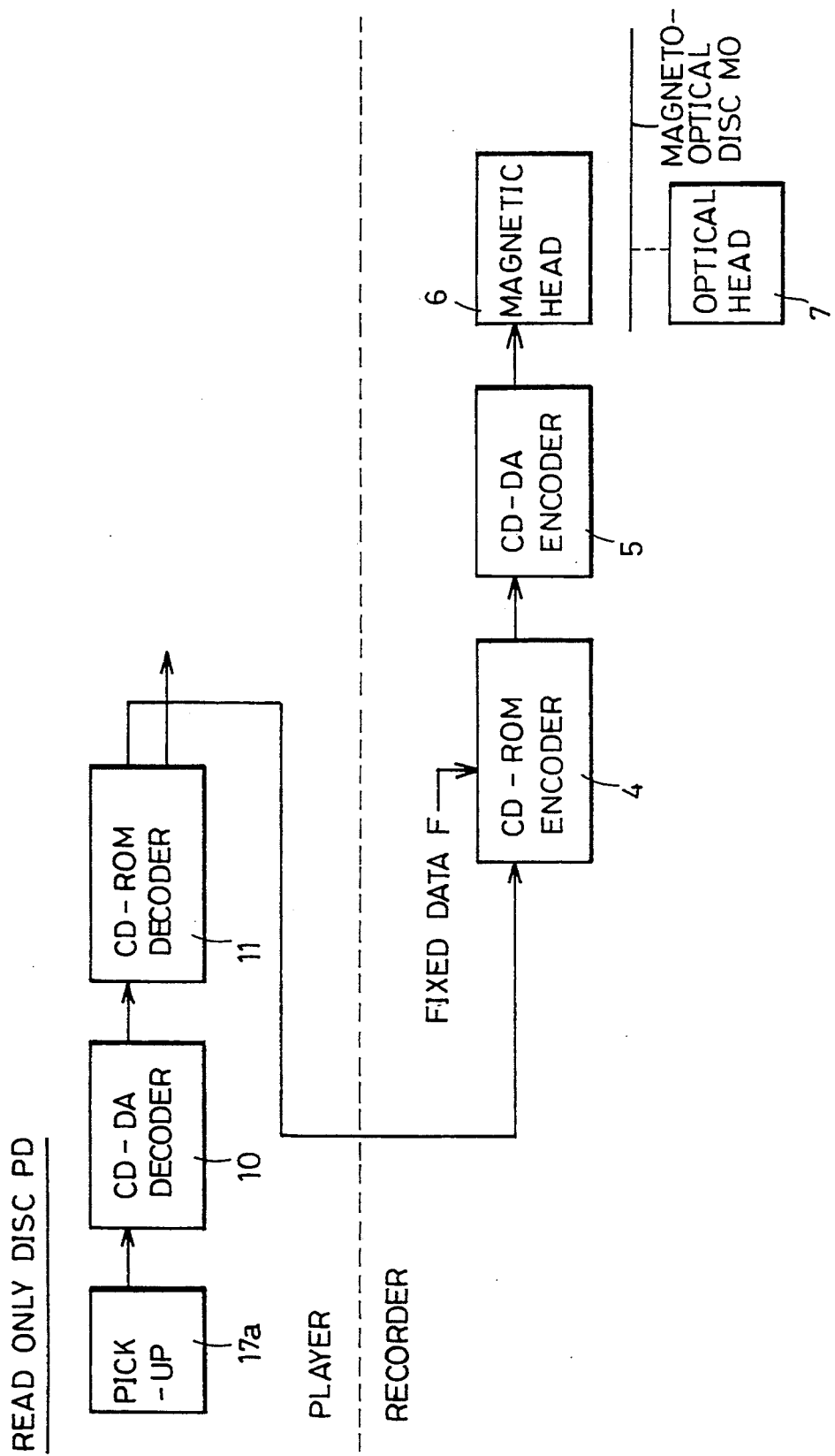
FIG. 6 is a block diagram showing a dubbing system according to another-embodiment of the present invention.
Figure 7:
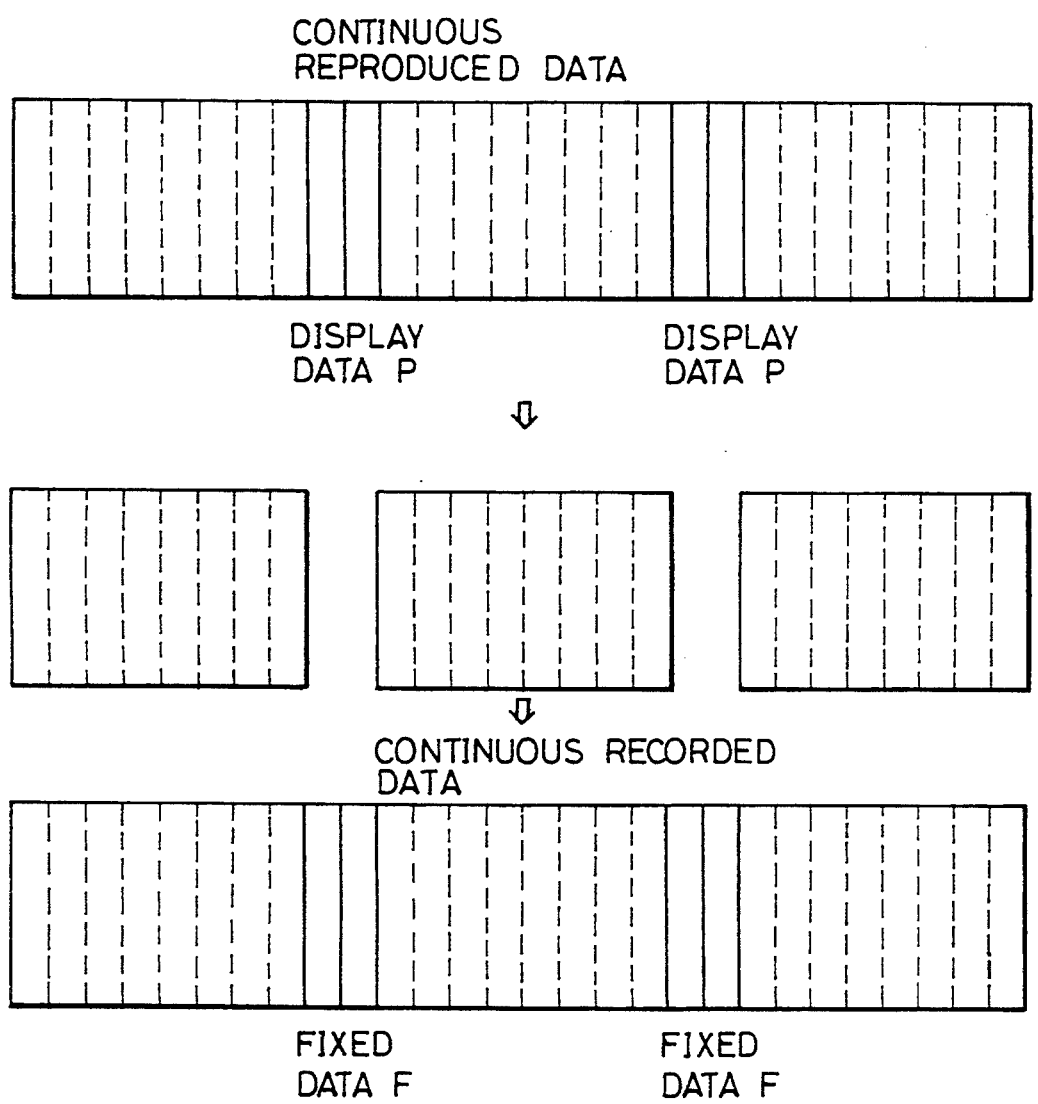
FIG. 7 schematically shows the conditions of the audio data in respective portions of the system shown in FIG. 6.

FIG. 6 is a block diagram schematically showing a dubbing system according to another embodiment of the present invention, and FIG. 7 schematically shows the audio data conditions of respective portions of the system of FIG. 6.

In comparison with the above-described embodiment of FIGS. 4 and 5 where dubbing operation is carried out at the normal encoding/reproduction speed, i.e. at low speed, the embodiment shown in FIGS. 6 and 7 realizes dubbing at a high speed by carrying out continuous recording and reproduction instead of the intermittent recording and reproduction of the data.

Referring to FIG. 6, the pick-up 17a continuously reproduces and provides to the CD-DA decoder 10 the EFM data from the read only disc PD. Similar to the embodiment of FIG. 4, the CD-DA decoder 10 applies an EFM modulation and de-interleave process and the like to the applied reproduced data to provide the same to the CD-ROM decoder 11. Similar to the embodiment of FIG. 4, the CDROM decoder 11 divides the entered reproduced data into audio data including control data, and display data P. Only the audio data is directly provided to the CD-ROM encoder 4 of the recorder side.

The CD-ROM encoder 4 inserts fixed data F into the missing portion of the compressed audio data caused by the separation and removal of the display data P to form a continuous data. The CD-ROM encoder 4 also applies a predetermined process such as the application of a synchronizing data to provide the same to the CD-DA encoder 5. The data provided to the CD-DA encoder 5 has a subcode identifying the sector applied, and is subjected to an interleave process and an EFM modulation process to be provided to the magnetic head 6 as EFM data. As in the case of FIG. 1, recording of the EFM data is carried out repetitively onto the small size disc MO by the magnetic head 6 and the optical head 7, whereby a spiral recording track is formed as a whole continuous track.

Thus, the embodiment of FIG. 6 has reproduction and recording carried out continuously in the respective sides of the player and the recorder, so that the time required for dubbing can be reduced to ¼ in comparison with the case shown in FIG. 4.

According to the present invention, digital audio information is recorded in a dubbing permitted area of a recording track, and associating information such as display data is recorded in a dubbing inhibited area in a read only disc, so that digital dubbing of digital audio information can be carried out. Also, dubbing of associating information is inhibited to ensure dominance as a master software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital dubbing system for copying information stored on a read only digital audio recording medium onto a digital audio recording and reproducing medium such that the information copied onto the recording and reproducing medium is not a complete copy of master information stored on said read only recording medium, said read only recording medium and said recording and reproducing medium each having a spiral track containing a respective plurality of contiguous record unit blocks, wherein each of said record unit blocks has a dubbing permitted area and a corresponding dubbing inhibited area so as to form a plurality of record unit blocks having dubbing permitted areas and corresponding dubbing inhibited areas, and wherein the record unit blocks on said read only recording medium contain compressed digital audio information in the dubbing permitted areas thereof and associating information in the dubbing inhibited areas thereof, wherein the associating information in the dubbing inhibited area in each of said record unit blocks on said digital audio recording medium has a pre-defined relationship to said compressed digital audio information in the corresponding dubbing inhibited area in said each block on said digital audio recording medium, said system comprising:

reproducing means for intermittently reproducing successive ones of the record unit blocks from the read only recording medium and for intermittently supplying as output the compressed digital audio information from the dubbing permitted areas in the successive record unit blocks in said read only recording medium; and recording means, connected to said reproducing means and responsive to said compressed digital audio information supplied therefrom, for intermittently recording successive record unit blocks in said recording and reproducing medium such that the compressed digital audio information is recorded in the corresponding dubbing permitted areas in the successive record unit blocks in said recording and reproducing medium and data other than the associating information is recorded in corresponding dubbing inhibited areas in the successive record unit blocks in said recording and reproducing medium, such that said data recorded in each of the record unit blocks on said recording and reproducing medium does not have said relationship to said compressed digital audio information recorded in the corresponding dubbing permitted area therein.

2. The system in claim 1 wherein the associating information stored in the dubbing inhibited area of each of the record unit blocks on said digital audio recording medium is lyric data associated with the compressed digital audio information stored within the corresponding dubbing permitted area in said each record unit block on said digital audio recording medium.

3. The system in claim 1 wherein the associating information stored in the dubbing inhibited area of each of the record unit blocks on said digital audio recording medium is image data associated with the compressed digital audio information stored within the corresponding dubbing permitted area in said each record unit block on said digital audio recording medium.

4. The system in claim 3 wherein the image data is still picture data.

5. A high speed digital dubbing system for copying information stored on a read only digital audio recording medium onto a digital audio recording and reproducing medium such that the information copied onto the recording and reproducing medium is not a complete copy of master information stored on said read only recording medium, said read only recording medium and said recording and reproducing medium each having a spiral track containing a respective plurality of contiguous record unit blocks, wherein each of said record unit blocks has a dubbing permitted area and a corresponding dubbing inhibited area so as to form a plurality of record unit blocks having dubbing permitted areas and corresponding dubbing inhibited areas, and wherein the record unit blocks on said read only recording medium contain compressed digital audio information in the dubbing permitted areas thereof and associating information in the dubbing inhibited areas thereof, wherein the associating information in the dubbing inhibited area in each of said record unit blocks on said digital audio recording medium has a pre-defined relationship to said compressed digital audio information in the corresponding dubbing inhibited area in said each block on said digital audio recording medium, said system comprising:

reproducing means for continuously reproducing successive ones of the record unit blocks from the read only recording medium and for continuously supplying as output the compressed digital audio information from the dubbing permitted areas in the successive record unit blocks in said read only recording medium; and recording means, connected to said reproducing means and responsive to said compressed digital audio information supplied therefrom, for continuously recording successive record unit blocks in said recording and reproducing medium such that the compressed digital audio information is recorded in the corresponding dubbing permitted areas in the successive record unit blocks in said recording and reproducing medium and data other than the associating information is recorded in corresponding dubbing inhibited areas in the successive record unit blocks in said recording and reproducing medium, such that said data recorded in each of the record unit blocks on said recording and reproducing medium does not have said relationship to said compressed digital audio information recorded in the corresponding dubbing permitted area therein.

6. The system in claim 5 wherein the associating information stored in the dubbing inhibited area of each of the record unit blocks on said digital audio recording medium is lyric data associated with the compressed digital audio information stored within the corresponding dubbing permitted area in said each record unit block on said digital audio recording medium.

7. The system in claim 5 wherein the associating information stored in the dubbing inhibited area of each-of the record unit blocks on said digital audio recording medium is image data associated with the compressed digital audio information stored within the corresponding dubbing permitted area in said each record unit block on said digital audio recording medium.

8. The system in claim 7 wherein the image data is still picture data.

* * * * *